(12) United States Patent
Dang et al.

(10) Patent No.: US 12,063,398 B2
(45) Date of Patent: Aug. 13, 2024

(54) HIGH THROUGHPUT NETWORK ENCRYPTION USING CCAP

(71) Applicant: Time Warner Cable Enterprises LLC, St. Louis, MO (US)

(72) Inventors: Niem Dang, Sterling, VA (US); Tom Gonder, Broomfield, CO (US); Peter J. Arnts, Leesburg, VA (US); Kirk Erichsen, Greenwood Village, CO (US); Brian Floyd, Charlotte, NC (US); Michael Kelsen, Centreville, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 521 days.

(21) Appl. No.: 15/888,000

(22) Filed: Feb. 3, 2018

(65) Prior Publication Data
US 2018/0184134 A1    Jun. 28, 2018

Related U.S. Application Data

(63) Continuation of application No. 13/923,180, filed on Jun. 20, 2013, now Pat. No. 9,888,270.
(Continued)

(51) Int. Cl.
| | |
|---|---|
| *H04N 7/16* | (2011.01) |
| *H04L 9/40* | (2022.01) |
| *H04N 21/2347* | (2011.01) |
| *H04N 21/61* | (2011.01) |
| *H04N 21/643* | (2011.01) |

(Continued)

(52) U.S. Cl.
CPC ..... *H04N 21/2347* (2013.01); *H04L 63/0428* (2013.01); *H04N 21/6118* (2013.01); *H04N 21/6125* (2013.01); *H04N 21/64322* (2013.01); *H04N 21/64707* (2013.01); *H04N 21/64715* (2013.01); *H04H 20/69* (2013.01); *H04H 60/14* (2013.01); *H04N 21/6405* (2013.01); *H04N 21/6408* (2013.01)

(58) Field of Classification Search
CPC ......... H04N 21/2347; H04N 21/64707; H04N 21/64322; H04N 21/64715; H04N 21/6125; H04N 21/6118; H04N 21/6408; H04N 21/6405; H04L 63/0428; H04H 60/14; H04H 20/69
See application file for complete search history.

(56) References Cited

U.S. PATENT DOCUMENTS 6,526,508 B2 * 2/2003 Akins, III .............. H04N 7/162
                                                                 713/153
7,039,189 B1 * 5/2006 Kienzle ............... H04L 63/0428
                                                                  380/210

(Continued)

OTHER PUBLICATIONS

Attached NPL search history.*
(Continued)

*Primary Examiner* — Annan Q Shang
(74) *Attorney, Agent, or Firm* — Otterstedt & Kammer PLLC

(57) ABSTRACT

A video distribution network includes a distribution plant and a first bulk encryption device connected to the distribution plant, wherein the bulk encryption device outputs a first encrypted video service stream to the distribution plant via an internet protocol (IP) interface.

19 Claims, 11 Drawing Sheets

Related U.S. Application Data

(60) Provisional application No. 61/789,210, filed on Mar. 15, 2013.

(51) Int. Cl.
*H04N 21/647* (2011.01)
*H04H 20/69* (2008.01)
*H04H 60/14* (2008.01)
*H04N 21/6405* (2011.01)
*H04N 21/6408* (2011.01)

(56) References Cited

U.S. PATENT DOCUMENTS

| | | | | |
|---|---|---|---|---|
| 7,565,680 | B1 * | 7/2009 | Asmussen | H04N 7/147 725/135 |
| 8,577,033 | B2 * | 11/2013 | Wasilewski | H04L 63/0823 380/240 |
| 9,942,077 | B2 * | 4/2018 | Hardin | H04L 27/34 |
| 2002/0196939 | A1 * | 12/2002 | Unger | H04N 21/23476 380/216 |
| 2003/0108199 | A1 * | 6/2003 | Pinder | H04N 21/23895 380/200 |
| 2003/0182553 | A1 * | 9/2003 | Medvinsky | H04L 63/061 713/171 |
| 2003/0200594 | A1 * | 10/2003 | McGreggor | A42B 1/041 2/202 |
| 2004/0049694 | A1 * | 3/2004 | Candelore | H04N 21/43607 726/14 |
| 2005/0060543 | A1 * | 3/2005 | Anspach | H04L 63/0428 713/165 |
| 2005/0097598 | A1 * | 5/2005 | Pedlow, Jr. | H04N 21/234381 725/31 |
| 2005/0169473 | A1 * | 8/2005 | Candelore | A01K 11/008 380/239 |
| 2006/0015945 | A1 * | 1/2006 | Fields | H04L 67/2823 726/27 |
| 2006/0037041 | A1 * | 2/2006 | Zhang | H04N 21/2381 725/32 |
| 2006/0218601 | A1 * | 9/2006 | Michel | H04N 7/173 725/87 |
| 2007/0160198 | A1 * | 7/2007 | Orsini | H04L 9/085 380/28 |
| 2007/0204300 | A1 * | 8/2007 | Markley | H04N 21/47202 348/E7.071 |
| 2007/0211891 | A1 * | 9/2007 | Shamoon | H04N 21/4343 380/28 |
| 2008/0066095 | A1 | 3/2008 | Reinoso | |
| 2008/0098212 | A1 * | 4/2008 | Helms | H04N 21/8193 713/155 |
| 2008/0137667 | A1 * | 6/2008 | Mohandas | H04N 21/2221 370/395.64 |
| 2008/0229379 | A1 | 9/2008 | Akhter | |
| 2008/0320540 | A1 * | 12/2008 | Brooks | H04N 21/25833 725/118 |
| 2009/0028327 | A1 * | 1/2009 | Pinder | H04L 63/062 380/212 |
| 2009/0217318 | A1 * | 8/2009 | VerSteeg | G06Q 30/02 725/32 |
| 2010/0037265 | A1 * | 2/2010 | Amir | H04L 27/18 725/54 |
| 2010/0064324 | A1 | 3/2010 | Jenkin et al. | |
| 2010/0138646 | A1 * | 6/2010 | Aloni | H04N 21/234363 713/150 |
| 2011/0096924 | A1 * | 4/2011 | Candelore | H04L 63/0428 380/210 |
| 2011/0113462 | A1 * | 5/2011 | Mao | H04L 45/22 725/119 |
| 2011/0119703 | A1 | 5/2011 | Schlack et al. | |
| 2011/0271306 | A1 * | 11/2011 | Kahn | H04N 7/162 725/68 |
| 2012/0060182 | A1 * | 3/2012 | Hardin | H04N 21/23895 725/31 |
| 2012/0137321 | A1 * | 5/2012 | Bjordammen | H04N 21/2225 725/31 |
| 2012/0331293 | A1 * | 12/2012 | Ma | H04N 21/2387 713/168 |
| 2013/0074138 | A1 | 3/2013 | Chapman | |
| 2013/0125194 | A1 | 5/2013 | Finkelstein et al. | |
| 2013/0129095 | A1 | 5/2013 | Fahrny et al. | |
| 2013/0156186 | A1 * | 6/2013 | Candelore | H04N 21/434 380/210 |
| 2014/0123169 | A1 * | 5/2014 | Koukarine | H04H 60/14 725/31 |
| 2014/0164760 | A1 * | 6/2014 | Hybertson | H04N 21/4627 713/153 |
| 2014/0282685 | A1 * | 9/2014 | Beals | H04N 21/835 725/31 |
| 2014/0282688 | A1 | 9/2014 | Dang et al. | |
| 2014/0304505 | A1 * | 10/2014 | Dawson | H04L 63/0428 713/165 |
| 2015/0143105 | A1 * | 5/2015 | Perrine | H04N 21/64715 713/153 |
| 2016/0248736 | A1 * | 8/2016 | Anspach | H04L 63/029 |

OTHER PUBLICATIONS

"Data-Over-Cable-Service-Interface Specifications Modular Headend Architecture, Edge QAM Video Stream Interface Specification". Cable Television Laboratories, Nov. 7, 2008, pp. I-IV, 1-35.

"Data-Over-Cable Service Interface Specifications Converged Cable Access Platform, Converged Cable Access Platform Architecture Technical Report". Cable Television Laboratories, Inc., May 11, 2012, pp. I-VI, 1-44.

"Data-Over-Cable Service Interface Specifications Converged Cable Access Platform, Operations Support System Interface Specification". Cable Television Laboratories, Inc, Aug. 9, 2012, pp. I-XIV, 1-388.

\* cited by examiner

CCAP AS BULK ENCRYPTOR

CCAP AT THE EDGE BRIDGES INTO THE HFC AND TAKES VARIOUS MPTS AND SPTS AND ENCRYPTS THESE VIDEO STREAMS THEN MUXES THEM INTO VARIOUS VIDEO QAM OUTPUTS. CONTENT CAN BE ENCRYPTED ONCE AND SENT THROUGH THE IP NETWORK TO THE HFC NETWORK WHERE CCAPs AND EQAMs MULTIPLEX THEM INTO THE HFC. ECMG LIKELY LOCATED IN THE SOURCE CENTER WITH THE CCAP-BE.

HIGH THROUGHPUT NETWORK ENCRYPTION USING CCAP

CROSS REFERENCE TO RELATED APPLICATION

This application is a continuation, under 37 CFR 1.53(b), of co-assigned U.S. patent application Ser. No. 13/923,180 of inventors Niem Dang et al., and claims the benefit thereof, said application Ser. No. 13/923,180 having been filed on 20 Jun. 2013, and entitled "HIGH THROUGHPUT NETWORK ENCRYPTION USING CCAP"; which in turn claims the benefit of U.S. Provisional Patent Application Ser. No. 61/789,210, filed Mar. 15, 2013. The complete disclosures of the aforesaid application Ser. No. 13/923,180 and provisional application No. 61/789,210 are hereby expressly incorporated herein by reference in their entireties for all purposes.

FIELD OF THE INVENTION

The present invention relates generally to the electrical, electronic, and computer arts, and more particularly relates to network encryption using a Converged Cable Access Platform (CCAP).

BACKGROUND OF THE INVENTION

Converged Cable Access Platform (CCAP) is a multi-service broadband and broadcast access architecture. The CCAP architecture supports products and services over both HFC (hybrid fiber-coaxial) and all-fiber residential and business services. The CCAP architecture is described in greater detail in Data-Over-Cable Service Interface Specifications (DOCSIS®) Converged Cable Access Platform Architecture Technical Report, CM-TR-CCAP-V02-110614, Cable Television Laboratories, Inc.

CCAP represents a migration path for all current and future access services. The CCAP architecture is designed to meet the technical requirements of existing forwarding and OSS (Operations Support System) interfaces, maintain compatibility with existing QAM (Quadrature Amplitude Modulation) based transmissions (e.g., encoded digital cable channels), and offer an integrated monolithic approach to edge service convergence.

CCAP combines the functionality of an EQAM (Edge QAM) with a CMTS (Cable Modem Termination System). However, CCAP systems, such as those specified in CCAP Operations Support System Interface (OSSI) I02, lack a mechanism for addressing video sources or components via Internet Protocol (IP) interfaces. This prevents video processing engines from outputting video sources to EQAM devices or integrated CCAP devices without having individually defined capabilities built into the video processing engines to enable IP-to-IP addressability.

SUMMARY OF THE INVENTION

According to an exemplary embodiment of the present disclosure, a video distribution network includes a distribution plant and a first bulk encryption device (CCAP BE device) connected to the distribution plant, wherein the bulk encryption device outputs a first encrypted video service stream to the distribution plant via an internet protocol (IP) interface.

According to an exemplary embodiment of the present disclosure, a Converged Cable Access Platform (CCAP) device is configured to performs a bulk encryption function, the CCAP device comprising a persistent storage device storing a control plane, a memory, and at least one processor, coupled to said memory, and operative, when said control plane is loaded into said memory, to configure said CCAP device to receive an input transport stream, configure said CCAP device to generate an encrypted input transport stream based on said input transport stream; and configure said CCAP device to select between an Single-Program Transport Stream output and an Multi-Program Transport Stream output and to output said encrypted input transport stream via said Single-Program Transport Stream output or said Multi-Program Transport Stream.

According to an exemplary embodiment of the present disclosure, a CCAP BE device can be implemented as a network encryption solution anywhere in a network. Such a CCAP BE device can be enabled by defining a video stream via a video-output-ts (transport system) element for a stream destined for an IP output.

DETAILED DESCRIPTION OF PREFERRED EMBODIMENTS

According to an exemplary embodiment of the present disclosure, an edge-designed CCAP platform can be implemented as a network encryption solution. Currently, the CCAP architecture outputs using RF output interfaces and lacks a mechanism where an operator can output IP unicast or multicast using IP interfaces. A central CCAP platform according to an exemplary embodiment of the present disclosure can operate as a network or bulk encryptor enabling operators to deliver video transport output via IP interfaces (i.e., unicast, multicast, etc.).

According to an exemplary embodiment of the present disclosure, within a central CCAP device an encryption engine can be separated from CAS (Conditional Access System) messaging. As such, a CCAP bulk encryption (CCAP BE) device can be abstracted from a CAS vendor, enabling an open market for the central CCAP BE device outside of a CAS provider. According to an exemplary embodiment of the present disclosure, an Entitlement Control Management Generation (ECMG) capability of the CCAP BE device can be used to separate an encryption function (e.g., bit-scrambling) from other messaging.

It should be understood that the existing CCAP is a pure edge device solution, designed to serve at an edge of a network where the IP is converted to RF (radio frequency) using DOCSIS and video Multi-Program Transport Stream (MPTS) encapsulation. According to an exemplary embodiment of the present disclosure, a CCAP BE device is not limited to placement at the edge of the network, such that the CCAP BE device can be placed at any location in the network. CCAP services can also be extended from video output to purely QAM based transmissions.

Embodiments of the present disclosure can be implemented as 1) multi-service broadband and broadcast access architecture; 2) network encryption; 3) encryption at the edge; 4) edge QAM/CCAP; 5) etc. As a bulk encryption device, a CCAP BE device according to an embodiment of the present disclosure can be used to implement various scrambling technologies including PowerKEY (Cisco/CA) and MediaCipher (Motorola/CA) scrambling.

Figure 1:
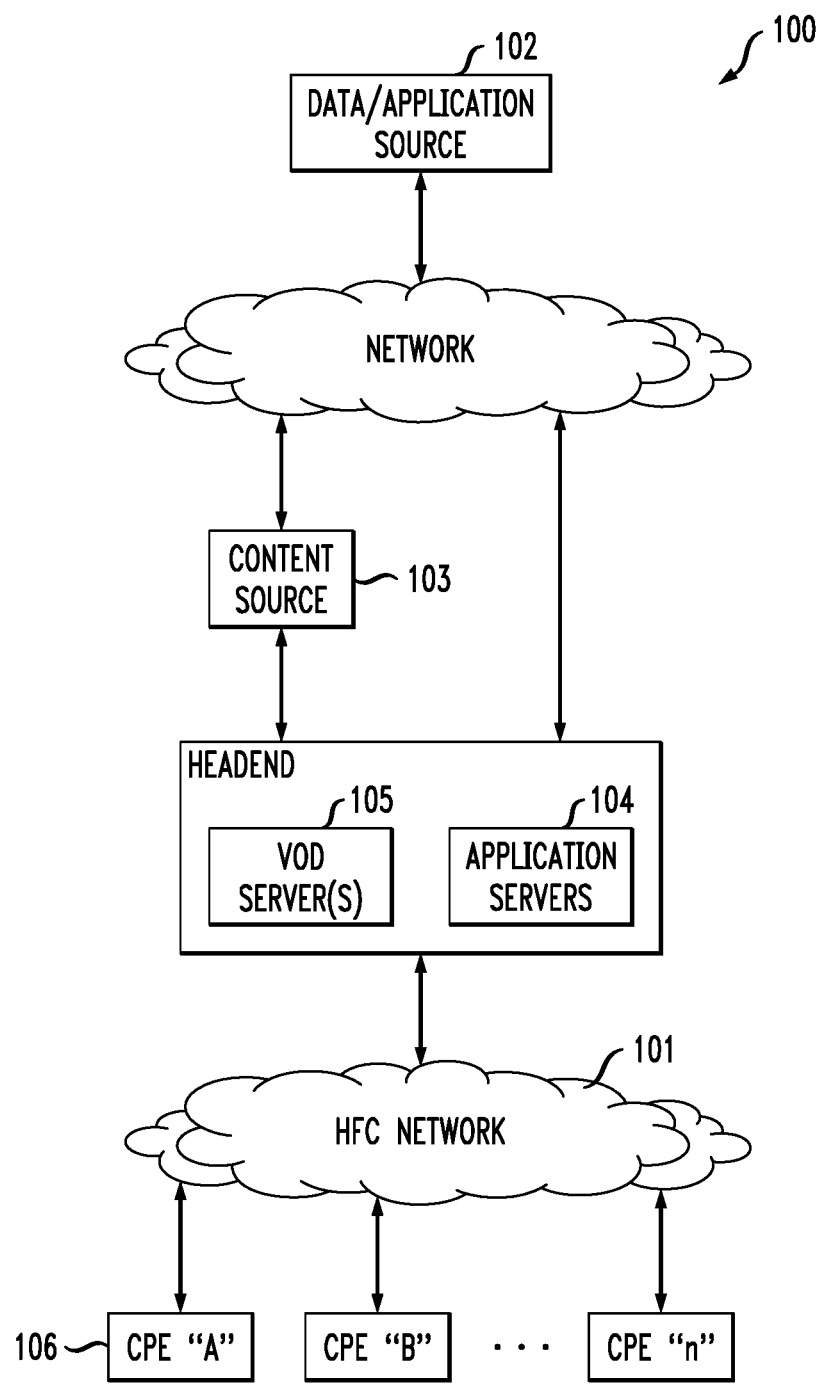
FIG. 1 is a functional block diagram illustrating an exemplary hybrid fiber-coaxial (HFC) network configuration.

FIG. 1 illustrates a typical content-based network configuration 100 with which techniques of the present disclosure may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) e.g., 106. The distribution server(s) 104, VOD servers 105 and CPE(s) 106 may be connected via a bearer network 101 (e.g., HFC). An exemplary architecture is shown in FIG. 1 for illustrative brevity, although it will be recognized that comparable architectures with multiple origination points, distribution servers, VOD servers, and/or CPE devices (as well as different network topologies) may be utilized consistent with the disclosure. For example, the head-end architecture of FIG. 2 (described in greater detail below) may be used.

It should be noted that in addition to an HFC network or a switched digital network as discussed below, other kinds of video content networks can be employed for network 101, including a satellite network, a fiber-to-the-home (FTTH) or fiber-to-the-curb (FTTC) network, etc.

The data/application origination point 102 comprises any medium that allows data and/or applications (such as a VOD-based or "Watch TV" application) to be transferred to a distribution server 104. This can include for example a third party data source, an application vendor website, a compact disk read-only memory (CD-ROM), an external network interface, a mass storage device (e.g., a Redundant Arrays of Independent/Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill in the art.

The application distribution server 104 comprises a computer system where such applications can enter the network system. Distribution servers are well known in the networking arts, and accordingly are not described further.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104.

Figure 2:
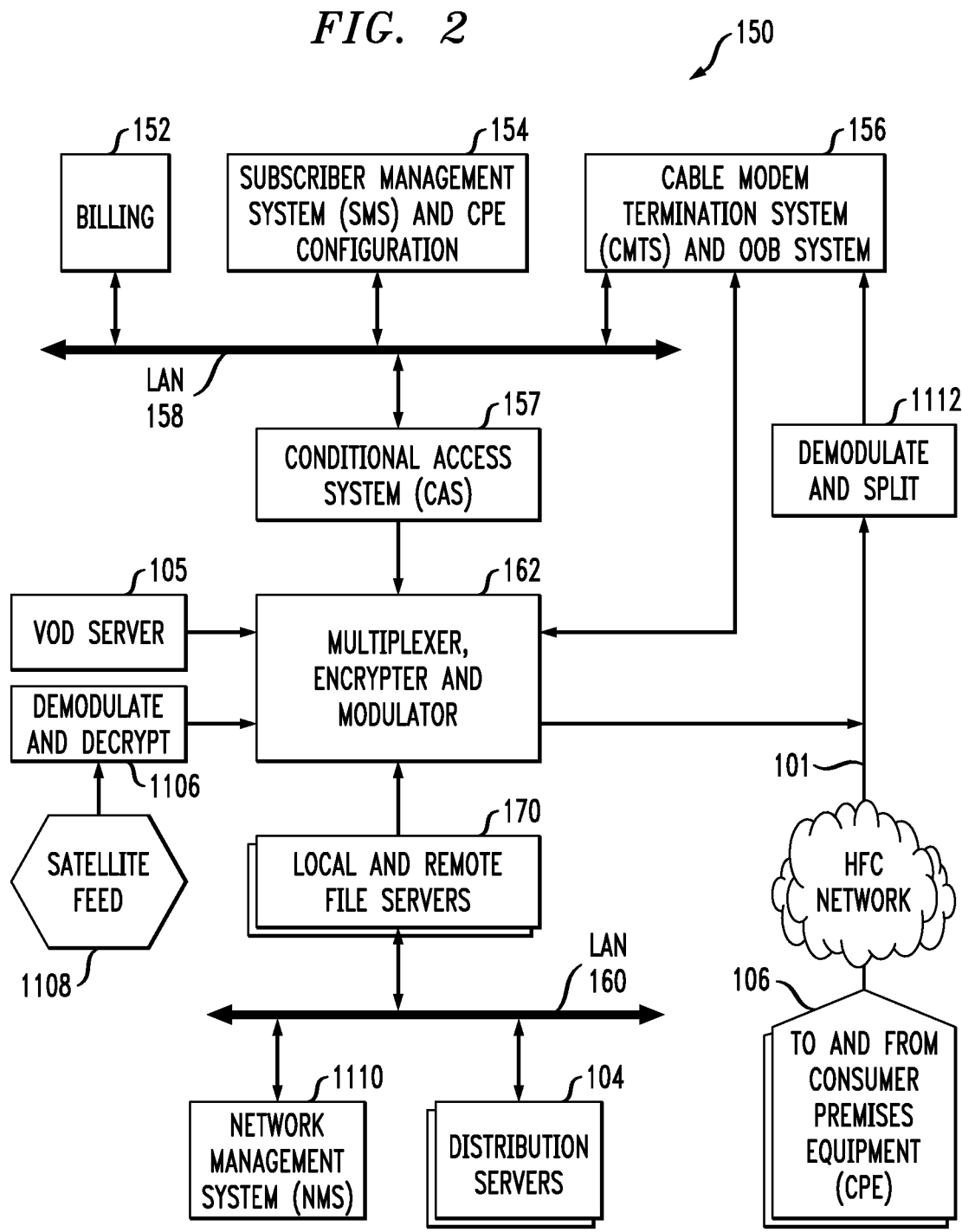
FIG. 2 is a functional block diagram illustrating one exemplary HFC cable network head-end configuration.

Referring now to FIG. 2, one exemplary embodiment of a head-end architecture useful with the present invention is described. As shown in FIG. 2, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the disclosure. It will also be appreciated that the head-end configuration depicted in FIG. 2 is high-level, conceptual architecture and that each multi-service operator or multiple system operator (MSO) may have multiple head-ends deployed using custom architectures.

The architecture 150 of FIG. 2 further includes a multiplexer/encryptor/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 3) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are herein expressly incorporated by reference in their entireties for all purposes. Other pertinent materials include the Data-Over-Cable Service Interface Specifications, IPv4 and IPv6 eRouter Specification (version 1.0 and any other versions), CM-SP-eRouter-I05-110210, and the Data-Over-Cable Service Interface Specifications, DOCSIS Set-top Gateway (DSG) Interface Specification, CM-SP-DSG-I17-110210, both available from Cable Television Laboratories, Inc., and both herein expressly incorporated by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some examples, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 3:
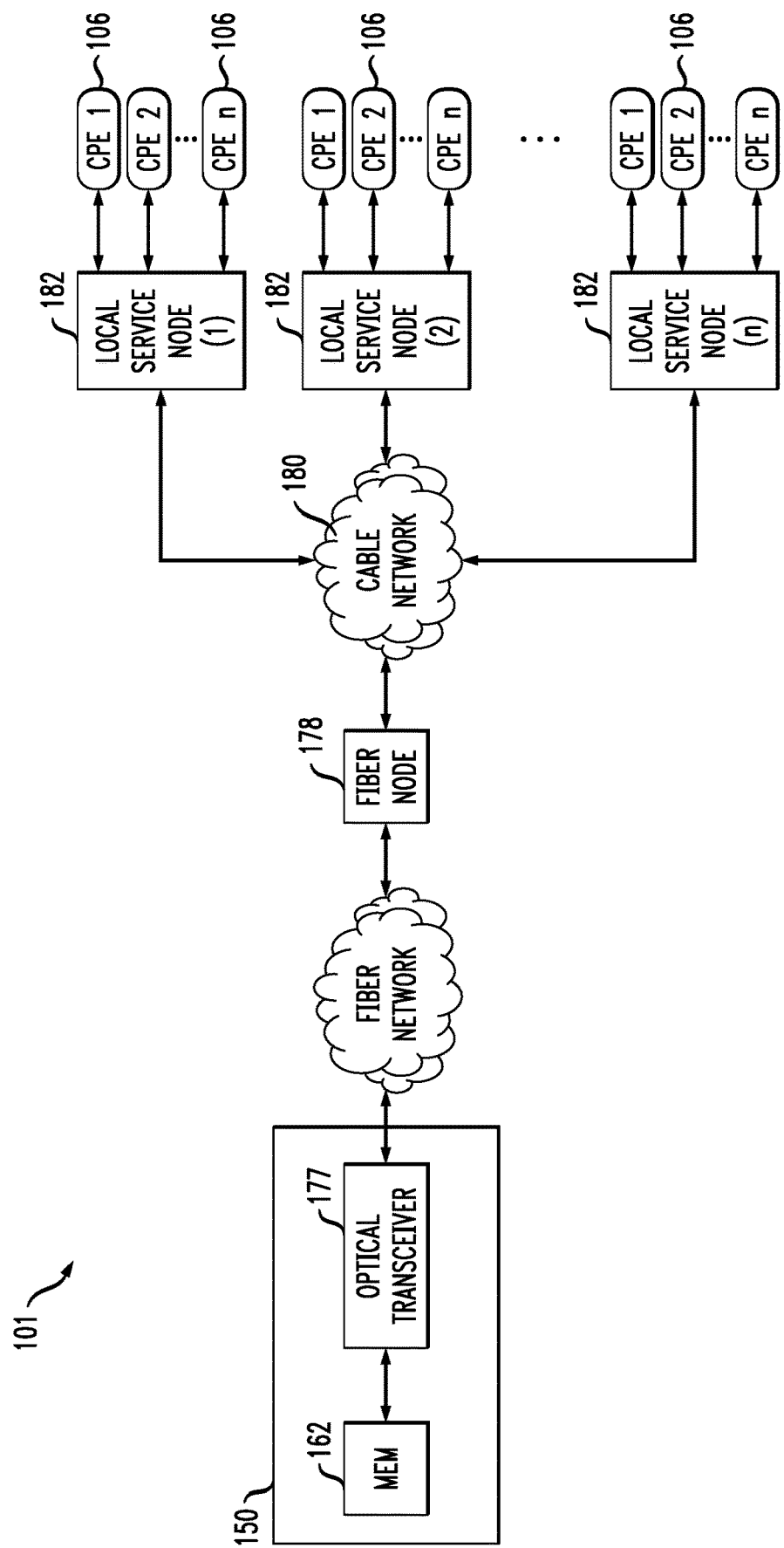
FIG. 3 is a functional block diagram illustrating one exemplary local service node configuration.

As shown in FIG. 3, the network 101 of FIG. 1 and FIG. 2 comprises a fiber/coax arrangement wherein the output of a multiplexer/encrypter/modulator (MEM) 162 is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

Figure 4:
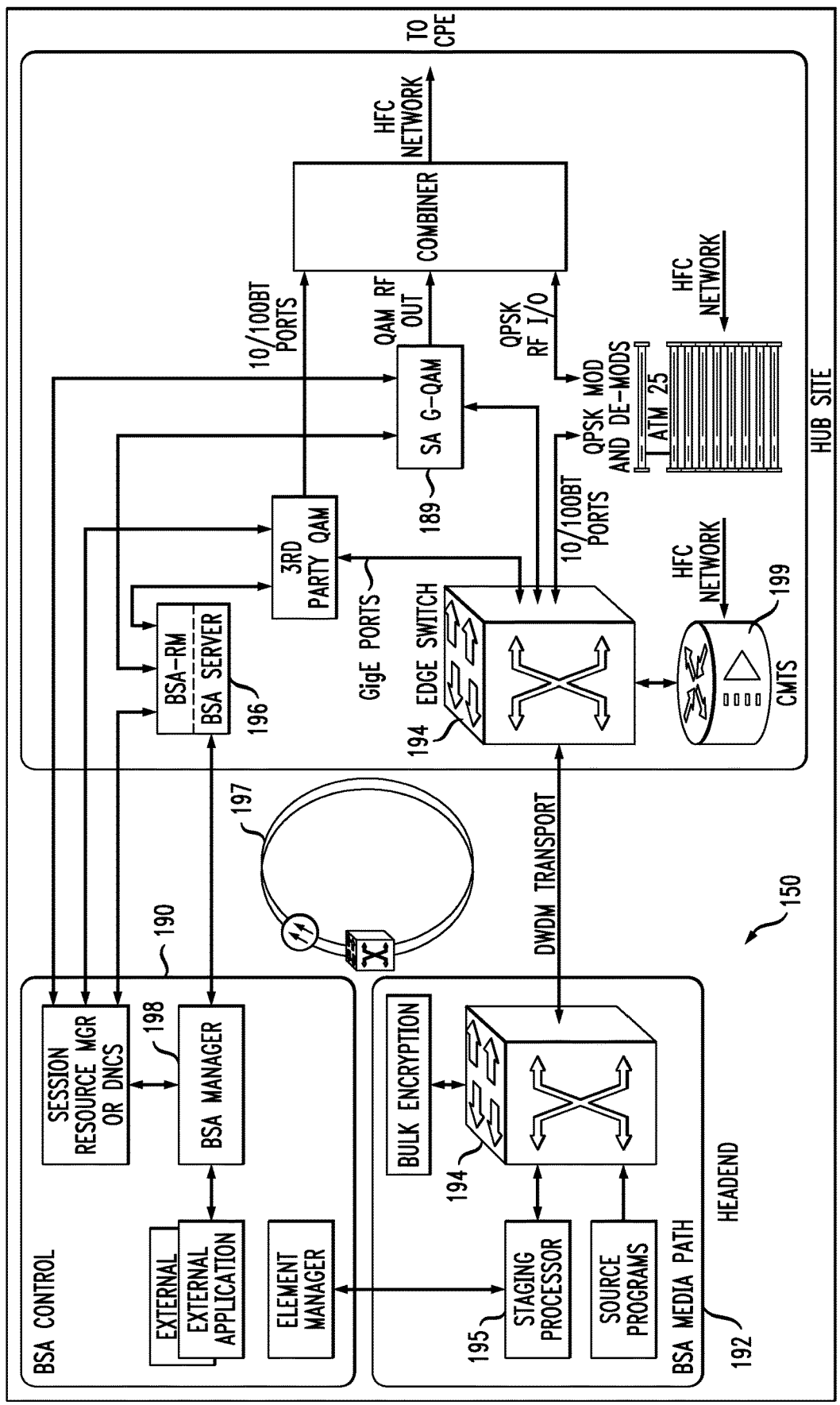
FIG. 4 is a functional block diagram illustrating one exemplary broadcast switched architecture (BSA) network useful with one or more embodiments of the present disclosure.

FIG. 4 illustrates an exemplary "switched" network architecture also useful with one or more embodiments of the present invention. While a broadcast switched architecture (BSA) network is illustrated in this exemplary embodiment, it will be recognized that the present disclosure is in no way limited to such architectures.

Switching architectures allow efficient bandwidth use for digital broadcast programs. The subscriber may be unaware of any difference between programs delivered using a switched network and ordinary streaming broadcast delivery.

FIG. 4 shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is herein expressly incorporated by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels, which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

Figure 5:
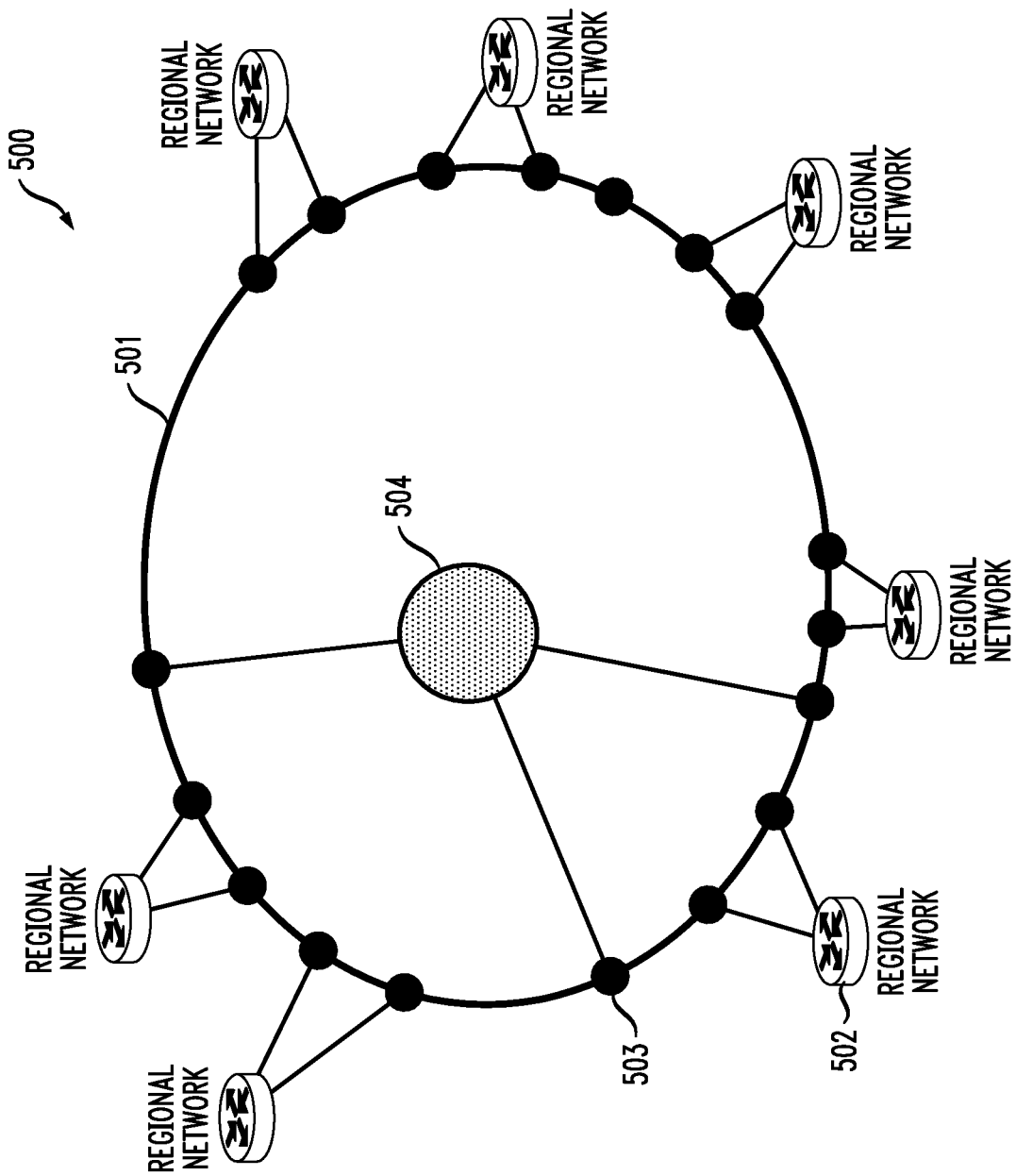
FIG. 5 is a diagram of exemplary placements for CCAP bulk encryptor (CCAP BE) devices in a ring architecture including connected regional network centers according to an embodiment of the present disclosure.

Referring now to an exemplary network 500 shown in FIG. 5, a CCAP BE device can be placed anywhere within this architecture (e.g., at market data center or nationals data center). The exemplary network 500 is configured in a ring architecture 501 with connected regional networks, e.g., 502, nodes, e.g., 503, and a source or distribution center 504. In either case, e.g., implementation at market data center or national data center, a video service stream can be encrypted at a level where advertisements are inserted. The video service stream can be output over a high-speed interface to a distribution plant (e.g., the network for FIG. 5).

According to an exemplary embodiment of the present disclosure, multiple CCAP BE devices can be implemented in parallel to provide redundancy. In this case, multiple identical encrypted streams are output to the hubs of the distribution plant and down to the CPE.

Turning now to the implementation of a CCAP BE device providing encryption services: the basis of bulk encryption is to apply an encryption function centrally and distribute encrypted content (e.g., video) throughout the network to be delivered in an edge network. In this manner, the encryption function need not be applied each time the same video is output into the HFC network. A bulk encryption service provided by a CCAP BE device according to an exemplary embodiment of the present disclosure gives an operator the ability to purchase EQAM functionality from vendors other than the CAS provider.

According to an exemplary embodiment of the present disclosure, a CCAP BE device can be dual-purposed as a multi-service broadband and broadcast access architecture and a bulk network encryption solution. Accordingly, encrypting services can be provided centrally, away from the edge.

Figure 6:
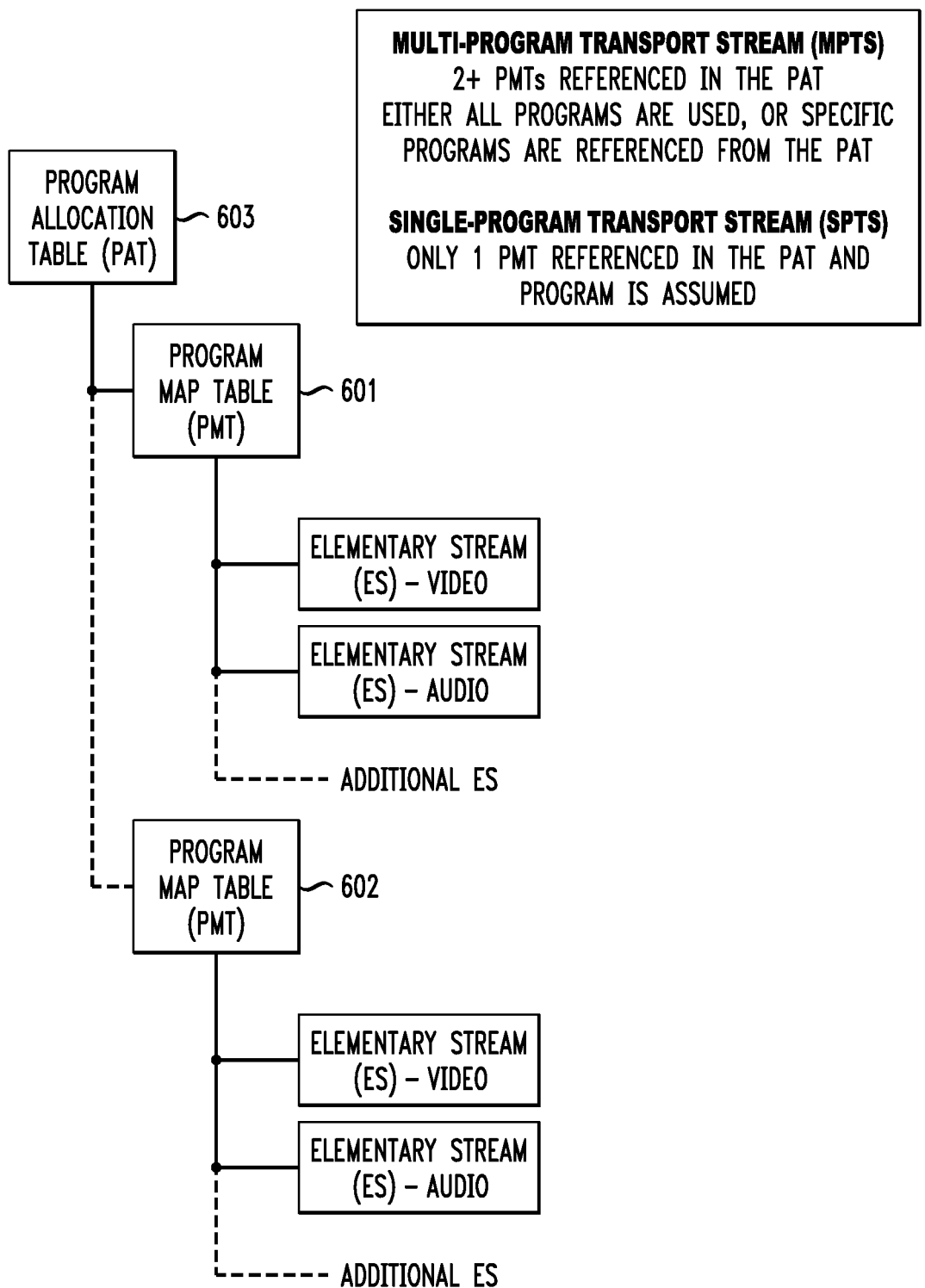
FIG. 6 is an illustration of the handling of different transport streams according to an embodiment of the present disclosure.

FIG. 6 depicts differences between MPTS and SPTS. The Multi-Program Transport Stream (MPTS) uses two or more program map tables (PMTs), e.g., 601 and 602, which contain information about the programs and are referenced in a Program Allocation Table (PAT) 603. For MPTS, either all programs are used, or specific programs are referenced from the PAT. The Single-Program Transport Stream (SPTS) uses one PMT, e.g., 601 referenced in the PAT 603 and the program is assumed.

Figure 7A:
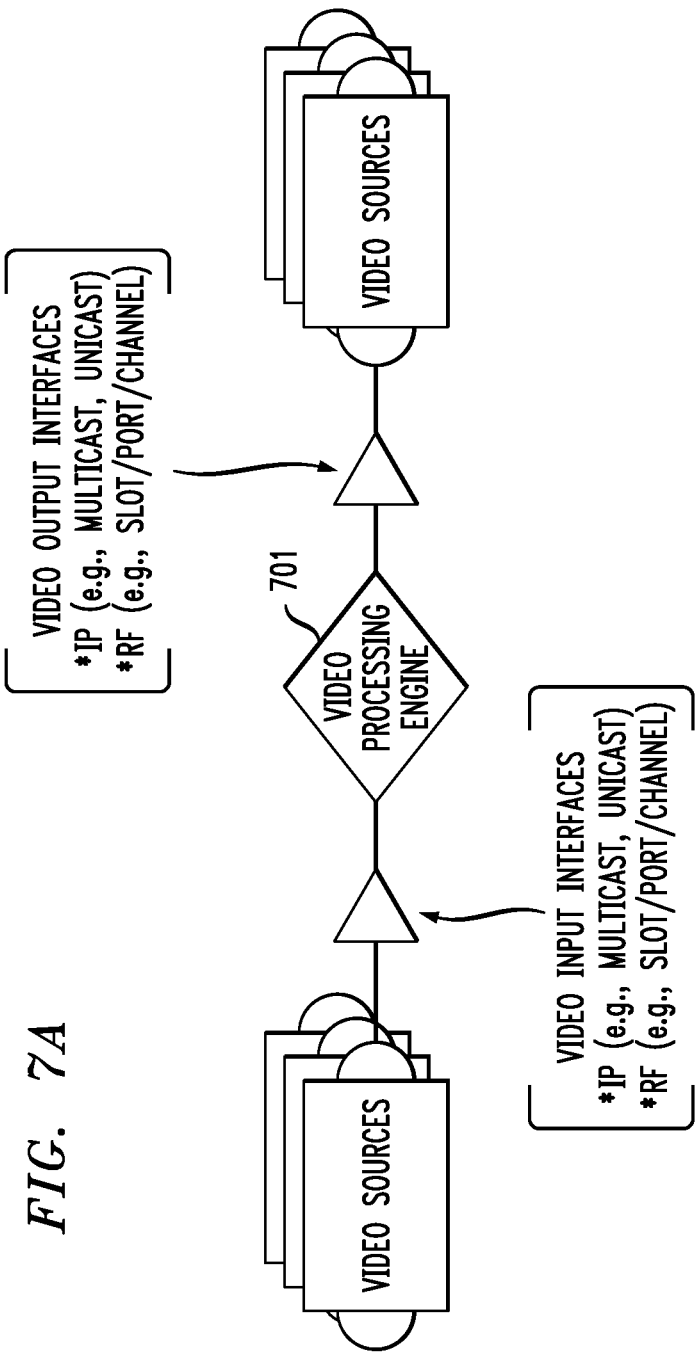
FIG. 7A is an abstraction of possible video flows in a CCAP BE device according to an embodiment of the present disclosure.

FIG. 7A is an abstraction of video flows through a video processing engine 701 according to an embodiment of the present disclosure. The video processing engine 701 can be the engine of a CCAP BE device.

Figure 7B:
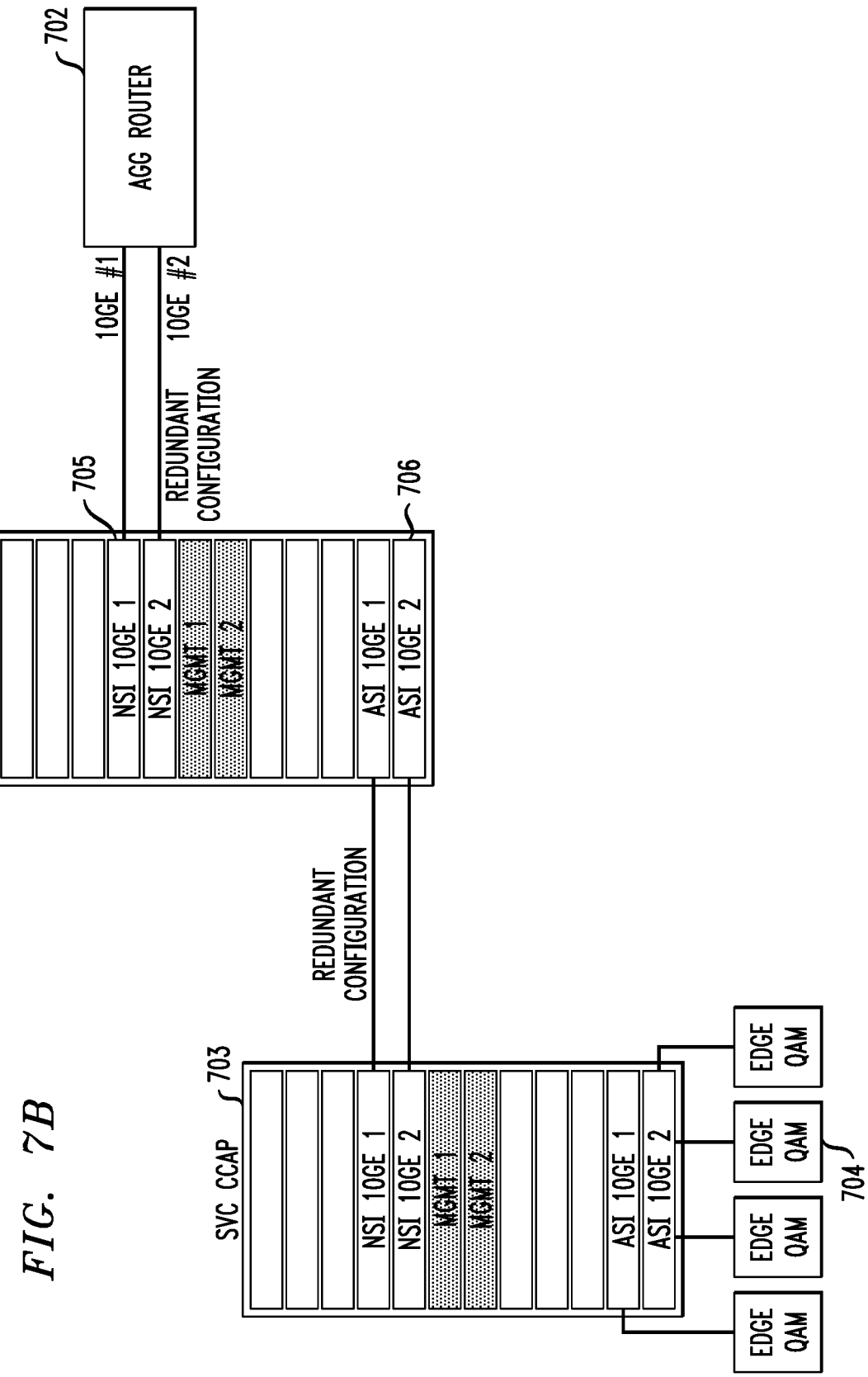
FIG. 7B is a diagram illustrating input and output (I/O) connections of a CCAP BE device according to an embodiment of the present disclosure.

Referring to FIG. 7B, the CCAP BE 701 is connected between an aggregation (agg) router 702 and one or more downstream CCAP devices 703 or service CCAP devices (SVC CCAP), disposed at the edge. Each CCAP device 703 can be connected to one or more edge QAM devices 704. The CCAP BE 701 can connect to the upstream aggregation router 702 by an Network Side Interface (NSI) 705 (e.g., 10 Gigabit Ethernet (10GE)). The CCAP BE 701 can connect to the downstream CCAP device(s) by an Asynchronous Serial Interface (ASI) 706.

It should be understood that the aggregation server 702 is a point of concentration for the multicast flows. The aggregation server 702 can be a Border Gateway Protocol (BGP) device that aggregates specific routes into one route.

In FIG. 7B, the service CCAP 703 can have coaxial type attachments to forward optical transmitters, or Gigabit Ethernet (GE) interfaces that connect to the edge QAM devices 704. The CCAP BE attaches (directly or indirectly) to CCAPs or Edge QAMs by way of controllers. That is, in addition to the connections depicted in FIG. 7B, the CCAP BE can be connect to the edge QAM device by way of a controller (not shown).

As shown in FIG. 7B, the CCAP BE can support redundant connections of GE interfaces. Further, more than one CCAP BE can be implemented with a first CCAP BE serving as "active" and a second CCAP BE serving as a "standby" device.

Figure 8A:
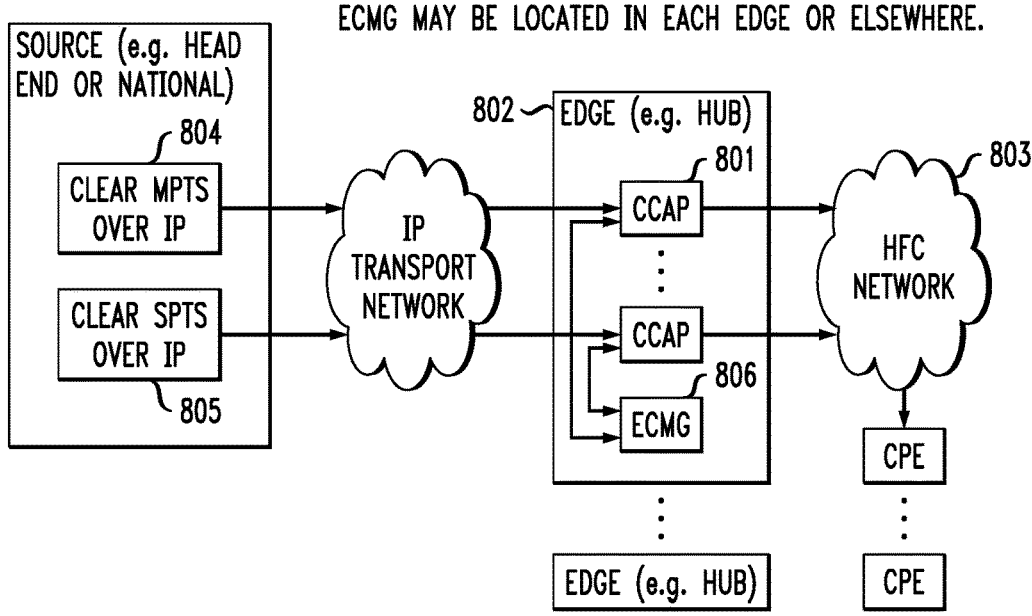
FIGS. 8A-B are diagrams of an existing CCAP device.
Figure 8B:
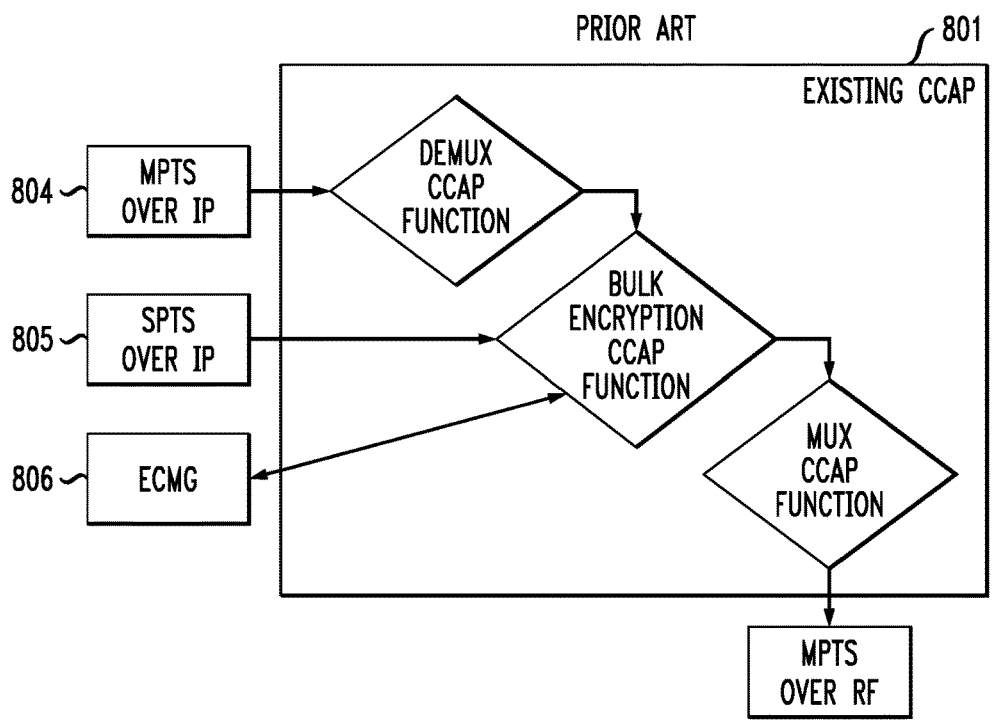

As shown in FIGS. 8A-B, in an existing system, a CCAP device 801 must be deployed at the edge, thus requiring that encryption be performed at the edge 802. The CCAP 801 at the edge 802 bridges into the HFC network 803 and takes various MPTS 804 and SPTS 805 and encrypts these video streams then multiplexes them into various video QAM outputs. The same content stream (e.g., a channel) is encrypted at every point and the CCAP 801 interfaces the IP network to the HFC network 803. The ECMG 806 may be located in each Edge or elsewhere.

Turning to an exemplary implementation of the present disclosure, a CCAP device can be deployed as a bulk encryptor (CCAP BE) by replacing existing network encryption devices such as the Cisco Netcrypt or Motorola SEM devices and direct video transport output to the IP interfaces of the CCAP devices residing at the hub sites (also see figure C for an example of possible video flows through TWC network).

According to an exemplary embodiment of the present disclosure, a CCAP BE device can be implemented anywhere in a network. Such a CCAP BE device can be enabled by defining a video stream via a video-output-ts (transport system) element for a stream destined for an IP output. The CCAP BE device can be configured via an execution of an XML-based configuration file that holds the configuration details for the platform. The XML configuration files are conformant to the XML schemas based on the CCAP configuration object model specified in this document.

Figure 9A:
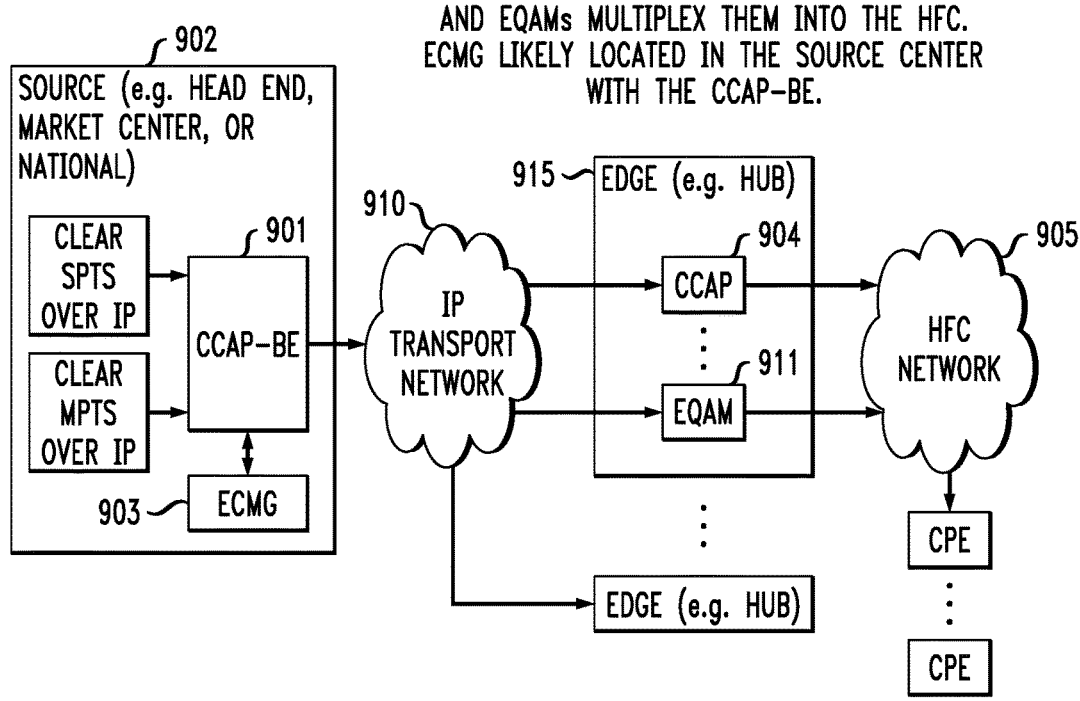
FIGS. 9A-B are diagrams of a CCAP bulk encryption device according to an embodiment of the present disclosure.
Figure 9B:
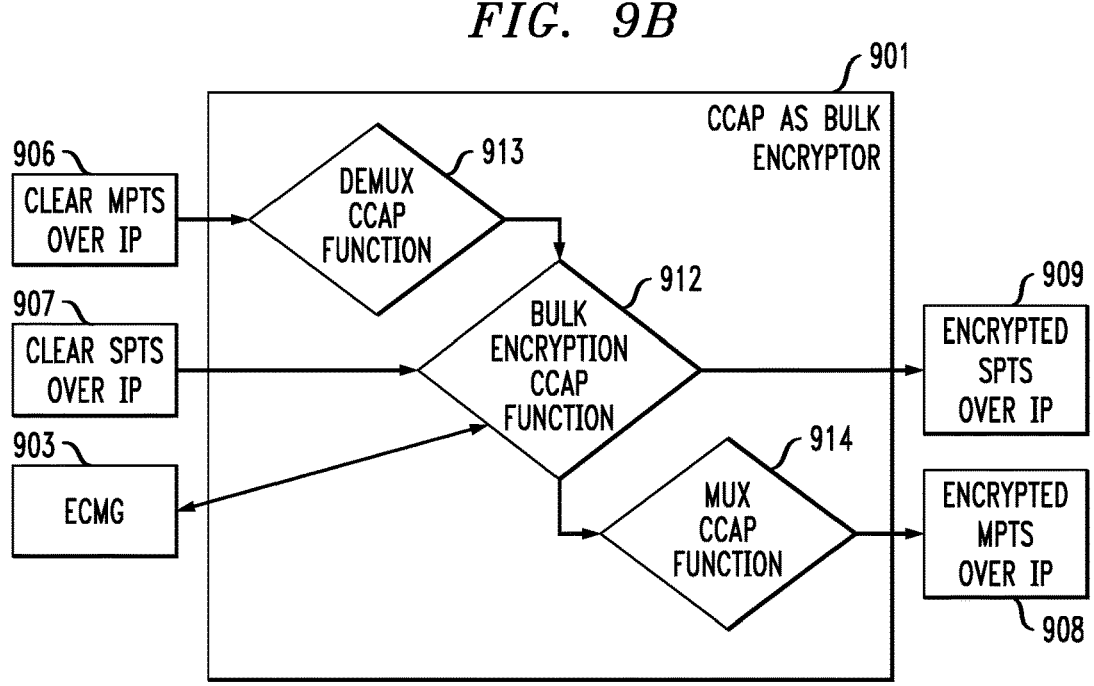

Referring to FIGS. 9A-B, a CCAP bulk encryptor (CCAP BE) 901 can be disposed at distribution plant or source center 902, the CCAP BE 901 providing SPTS encrypted output streams as well as MPTS encrypted output streams over IP, which ensures continuity with other bulk encryptors from the CAS providers. Further, a flow between the ECMG 903 and a CCAP 904 at the edge is not disrupted, so that the CAS is not aware of this transport over IP. Further, the CCAP BE 901 can receive clear MPTS 906 and clear SPTS 907 output encrypted MPTS 908 and encrypted SPTS 909, since encryption and multiplexing (muxing) are often thought together logically when the target is the QAM output into the HFC 905.

The CCAP 904 at the edge bridges into the HFC network 905 and takes various MPTS and SPTS (e.g., 906 and 907 in FIG. 9B) and encrypts these video streams then multiplexes them into various video QAM outputs (e.g., 908 and 909). The content stream is encrypted once at the source center 902 and sent through the IP network 910 to the edge where CCAPs 904 and EQAMs 911 multiplex them into the HFC network 905. It should be understood that the content can be encrypted more than one time, but that according to an embodiment of the present disclosure, an encryption function can be applied to content to be delivered to one or more edge networks (915). Further, the ECMG 903 can be located in the source center 902 with the CCAP-BE 901. The ECMG 903 is not limited to locations in the source center 902 and can be located elsewhere.

Figure 10:
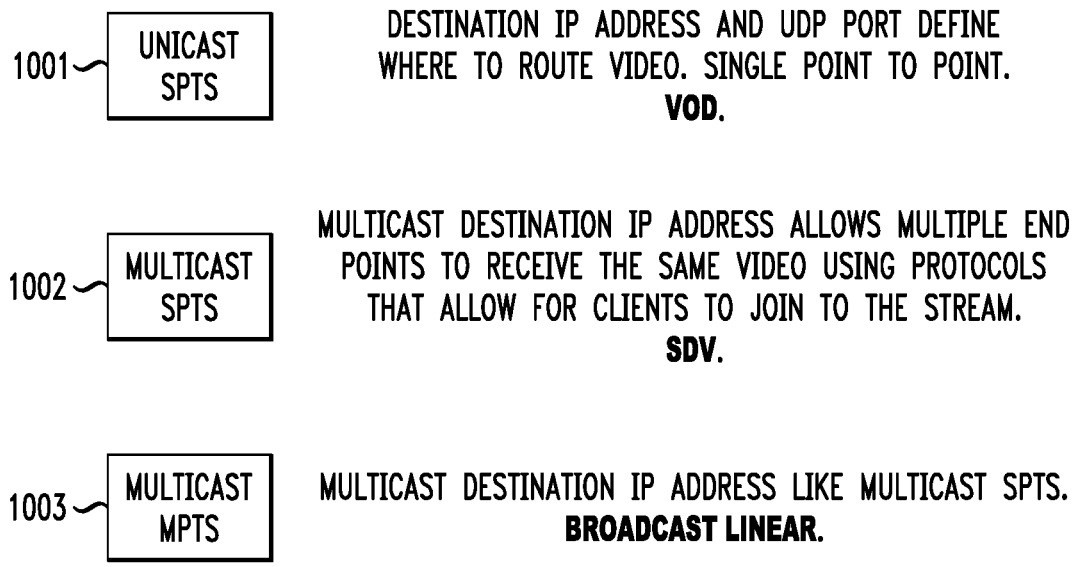
FIG. 10 is a schema showing different transport stream options according to an embodiment of the present disclosure.

Referring to FIG. 10, different transport stream options for output of the CCAP BE device according to an embodiment of the present disclosure. For example, the CCAP BE device can output unicast SPTS 1001, for example, including video-on-demand (VOD) content, wherein a destination IP address and a UDP port can be used to route video in a single point to point context. The CCAP BE device can output multicast SPTS 1002, for example, including Switched Digital Video (SDV) content, wherein a multicast destination IP address allows multiple end points to receive the same video using protocols that allow for clients to join to the stream. Further, the CCAP BE device can output and multicast MPTS 1003, for example, including broadcast linear content, using a multicast destination IP address similar to the multicast SPTS example.

Referring again to FIG. 9, more generally, the CCAP BE 901 provides an option to accept incoming transport streams (e.g., 903, 906, 907, etc.) and apply network encryption to them at 912, protecting the transport streams as they traverse the network of the cable operator. Furthermore, conditional access (CA) encryption can be applied for downstream transmission. The CCAP BE 901 can include hardware and/or software for implementing a demultiplexing component 913 (e.g., supporting 128-bit AES decryption) and a multiplexing component 914 dynamically processing the incoming transport streams, according to the requirements of each content protection session.

The CCAP content protection data path is designed to support all of the decryption and content protection needs for video cable services including video-on-demand, switched digital video, linear digital broadcast, etc.

Referring to the access encryption; the CCAP BE engine 912 is a scrambling engine; the conditional access intelligence can reside in the ECM Generator (ECMG) 903. The CCAP BE engine 912 can be controlled by of one or more external ECMGs and applies an encryption layer required to secure the content distribution based on ECMG provided access criteria. In Simulcrypt operation, the CCAP BE engine 912 provides the same control word and access criteria to all ECMGs, which in return generate their matching ECMs. In non-Simulcrypt operation, the CCAP BE engine 912 receives both control words and ECMs from the selected ECMG, based on the provided access criteria.

The CCAP BE engine 912 supports both DigiCipher and PowerKEY conditional access systems, with support for encryption algorithms including DES (Data Encryption Standard), CSA (Common Scrambling Algorithm), 128-bit AES, etc.

Definitions

IP Video Input Transport Stream Interface (IPVITSIF)
  Unicast/Multicast definition that complies with either IPv4 or IPv6 address
IP Video Output Transport Stream Interface (IPVOTSIF)
  Unicast/Multicast definition that complies with either IPv4 or IPv6 address
IP Video Input Transport Stream (IPVITS)
IP Video Output Transport Stream (IPVOTS)
  Pseudo Code for Control Plane:

```
BEGIN
   WHILE (TRUE)
      DEFINE IPVITS configuration as PRIMARY
      DEFINE alternate IPVITS configuration as SECONDARY
      DEFINE IPVOTS configuration
      DEFINE configuration to decrypt the IPVITSs with the applicable ECMD engine
      If (REQUIRED)
      DEFINE configuration to output selected programs from an MPTS as
   SPTSs
   If (REQUIRED)
      DEFINE configuration to output selected SPTSs as MPTS
   DEFINE configuration to encrypt IPVOTSs with the applicable ECMG engines
END
```

According to an exemplary embodiment of the present disclosure, in a CCAP BE configuration, a video-output-ts element can include an ip-interface-name as pointer to an ip-interface-name defined elsewhere in a configuration file (config file). The video-output-ts element is an intermediate object that represents a configuration multiplex of one or more ProgramSession instances. A ProgramSession object statically configures the mapping of input transport streams to one or more video-output-ts instances.

According to an exemplary embodiment of the present disclosure, a video-output-ts element can include a destination IP address attribute, which can be either a unicast or multicast IP address. This attribute can be used when configuring a video stream to be sent out an IP interface.

According to an exemplary embodiment of the present disclosure, a video-output-ts element can include a destination UDP port number attribute. This attribute can be used when configuring a video stream to be sent out an IP interface.

According to an exemplary embodiment of the present disclosure, a video-output-ts element can be configured to make a video-down-channel-ref attribute optional. This attribute can be used when configuring a video stream to be sent out a QAM down-channel.

The following is an example of pseudo code for a video input interface and a video output interfaces on a control plane. The control plane provides a foundation for operators to extend services to incorporate different forms of content from multiple sources. More particularly, the control plane can be used by the CCAP BE for signaling between a content source (connected to an input transport stream such as an RF source) and the IP transport network systems (connected to an output transport stream), and can be implemented as part of a Packet to Access Shelf Interface (PAST). The content plane can use the Access Node Control Protocol (ANCP) protocol. The ANCP protocol is a real time protocol used to communicate information. It should be understood that the control plane can be implemented in various forms and is not limited to the exemplary pseudo code provided herein.

It should be understood that the control plane is a user interface for a platform (CCAP device). The control plane can be embodied in various forms including, for example, graphical user interface (GUI) enabling a user to manage functions (e.g., define IPVITS/IPVOTS configuration, specify encryption, define an output configuration, etc.) of the platform, such that the user can configure and monitor packet switching and routing from a computer.

For video input interfaces, a stream input specification specifies the video EQAM stream input Ethernet interfaces, video stream over MPEG-2 transport stream/IP/UDP encapsulation, unicast, multicast, and network de-jittering specifications. Given the discussion thus far, it will be appreciated that, in general terms, an exemplary method, according to an exemplary aspect of the invention, includes a video distribution network including a distribution plant and a first bulk encryption device connected to the distribution plant, wherein the bulk encryption device outputs a first encrypted video service stream to the distribution plant via an internet protocol (IP) interface.

Further, according to an exemplary aspect of the invention, a CCAP device can be configured to perform a bulk encryption function, wherein the CCAP device includes a persistent storage device storing a control plane, a memory, and at least one processor, coupled to the memory, and operative, when the control plane is loaded into the memory, to configure the CCAP device to receive an input transport stream, configure said CCAP device to generate an encrypted input transport stream based on said input transport stream, and configure said CCAP device to select between an Single-Program Transport Stream output and an Multi-Program Transport Stream output and to output said encrypted input transport stream via said Single-Program Transport Stream output or said Multi-Program Transport Stream.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code that is stored thereon in a non-transitory manner and which is configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a non-transitory manner on a tangible computer-readable recordable storage medium (or multiple such media). Appropriate interconnections via bus, network, and the like can also be included.

Many aspects of the invention can be implemented, or at least facilitated, for example, by a CMTS with suitable hardware and/or software layers and/or policies to implement logic as described herein.

Figure 11:
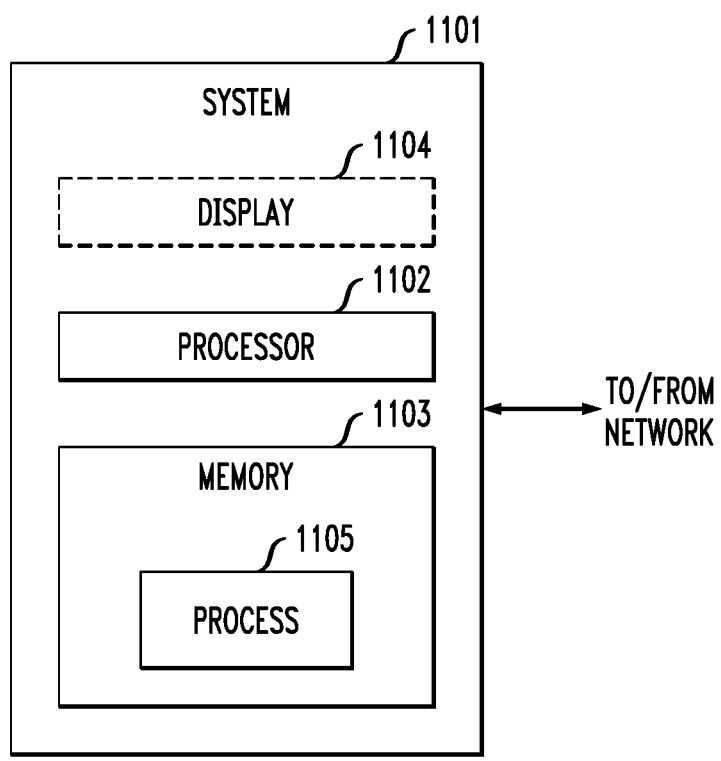
FIG. 11 is a block diagram of an exemplary computer system useful in implementing at least a portion of one or more embodiments of the invention.

FIG. 11 is a block diagram of a data processing system 1101, processor 1102 of which is representative of processors associated with servers, clients, set top terminals 106, a central CCAP device, and various elements with processing capability depicted in the figures, such as for outputting an encrypted video service stream to a distribution plant via an internet protocol (IP) interface.

As shown in FIG. 11, memory 1103 configures the processor 1102 to implement one or more methods, steps, and functions (collectively, shown as process 1105 in FIG. 11). The memory 1103 could be distributed or local and the processor 1102 could be distributed or singular. The memory 1103 could be implemented as an electrical, magnetic or optical memory, or any combination of these or other types of storage devices. It should be noted that if distributed processors are employed, each distributed processor that makes up processor 1102 generally contains its own addressable memory space. It should also be noted that some or all of computer system 1101 can be incorporated into an application-specific or general-use integrated circuit. For example, one or more processes could be implemented in hardware in an ASIC rather than using firmware. Display 1104 is representative of a variety of possible input/output devices (e.g., mice, keyboards, printers, etc.).

As is known in the art, part or all of one or more aspects of the methods and apparatus discussed herein may be distributed as an article of manufacture that itself includes a computer readable medium having computer readable code means embodied thereon (e.g., with instructions and/or policies to be stored in storage and loaded into memory to cause processor to implement the routing aspects with respect to traffic on ports). The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a processor to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers, and/or router, described herein each contain a memory that can configure associated processors to implement certain methods, steps, and functions disclosed herein. The memories could be distributed or local and the processors could be distributed or singular. The memories could be implemented as an electrical, magnetic or optical memory, or any combination of these or other types of storage devices. Moreover, in at least some instances, the term "memory" encompasses any information able to be read from or written to an address in the addressable space accessed by an associated processor. With this definition, information on a network is still within a memory because the associated processor can retrieve the information from the network.

Thus, elements of one or more embodiments of the present invention can make use of computer and/or microprocessor technology with appropriate instructions to implement method steps described herein.

As used herein, including the claims, a "server" includes a physical data processing system (for example, system 1101 as shown in FIG. 11) running a server program. It will be understood that such a physical server may or may not include a display, keyboard, or other input/output components.

Furthermore, it should be noted that any of the methods described herein can include an additional step of providing a system comprising one or more distinct software modules embodied on one or more tangible computer readable storage media (e.g., in storage or on another tangible medium for ultimate loading into storage). All the modules (or any subset thereof) can be on the same medium, or each can be on a different medium, for example. The modules can include, for example, a bulk encryption module; any or all of the software components shown in the figures can be implemented with suitable modules. The method steps can then be carried out using the distinct software module(s) of the system, as described above, executing on the one or more hardware processors. The same then form a particular machine, for example:

Outputting an encrypted video service stream to a distribution plant via an Internet Protocol (IP) interface.

Further, a computer program product can include a tangible computer-readable recordable storage medium with code adapted to be executed to carry out one or more method steps described herein, including the provision of the system with the distinct software module(s). In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Washington, USA); Oracle® software (registered mark of Oracle International Corporation, 500 Oracle Parkway, Redwood City, CA 94065, USA); Informix® software (registered mark of International Business Machines Corporation, Armonk, New York, USA); and structured query language (SQL) software available from many sources, including Microsoft Corporation, Redmond, Washington, USA).

Accordingly, it will be appreciated that one or more embodiments of the invention can include a computer program product including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein; e.g., in connection with FIGS. 5 and 6.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, any blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing a bulk encryption at a source center comprising:
   receiving an input transport stream;
   generating an encrypted input transport stream based on said input transport stream, wherein said encrypted input transport stream is one of an encrypted Single-Program Transport Stream output and a Multi-Program Transport Stream;
   conditioning said encrypted input transport stream for transmission through an internet protocol transport network to a destination device at an edge of said internet protocol transport network according to a configuration file; and
   outputting, by said source center, said encrypted input transport stream via said Single-Program Transport Stream output to said,
   wherein said edge of said internet protocol transport network bridges into a hybrid fiber-coaxial network and said source center is located away from said edge.

2. The method of claim 1, wherein said bulk encryption is performed simultaneously by a plurality of bulk encryptors connected in a video distribution network to generate copies of said encrypted input transport stream.

3. The method of claim 1, further comprising mapping programs of said input transport stream from said source center to content of a first encrypted video service stream output to a hub of a distribution plant.

4. The method of claim 1, wherein said input transport stream is one of an input clear Multi Program Transport Stream and an input clear Single-Program Transport Stream.

5. The method of claim 4, wherein conditioning said encrypted input transport stream further comprises joining a plurality of Multi Program Transport Streams of said input transport stream into said encrypted input transport stream.

6. The method of claim 1, wherein outputting said encrypted input transport stream to said destination device is performed through said internet protocol transport network of a distribution plant to said edge of said internet protocol transport network according to a destination internet protocol (IP) address.

7. The method of claim 1, wherein conditioning said encrypted input transport stream for transmission through said internet protocol transport network to said destination device at said edge of said internet protocol transport network according to said configuration file comprises including a destination internet protocol (IP) address of said destination device in said encrypted input transport stream.

8. The method of claim 1, further comprising outputting, from said source center, conditional access messaging with said encrypted input transport stream for controlling access of a consumer premises equipment device to content of said encrypted input transport stream.

9. The method of claim 1, wherein said destination device is a Converged Cable Access Platform (CCAP) device.

10. The method of claim 1, wherein said destination device is an Edge Quadrature Amplitude Modulation (EQAM) device.

11. A method for performing a bulk encryption at a source center comprising:
    receiving an input transport stream;
    generating an encrypted input transport stream based on said input transport stream;
    conditioning said encrypted input transport stream for transmission through an internet protocol transport network of a distribution plant to a plurality of destination devices at an edge of said internet protocol transport network; and
    outputting, by said source center, said encrypted input transport stream via a Multi-Program Transport Stream output to said plurality of destination devices at a plurality of edge networks at said edge of said internet protocol transport network,
    wherein said plurality of edge network bridge into respective hybrid fiber-coaxial networks and said source center is located away from said edge.

12. The method of claim 11, wherein said bulk encryption is performed simultaneously by a plurality of bulk encryptors connected in a video distribution network to generate copies of said encrypted input transport stream.

13. The method of claim 11, further comprising mapping programs of said input transport stream from said source center to content of a first encrypted video service stream output to said plurality of destination devices.

14. The method of claim 11, wherein said input transport stream is one of an input clear Multi Program Transport Stream and an input clear Single-Program Transport Stream.

15. The method of claim 14, further comprising joining a plurality of Multi Program Transport Streams, including the input clear Multi Program Transport Stream, in generating said encrypted input transport stream.

16. The method of claim 11, wherein said input transport stream includes an input Multi-Program Transport Stream and said method further comprises:
- demultiplexing said input Multi-Program Transport Stream prior to generating said encrypted input transport stream; and
- multiplexing said encrypted input transport stream to generate an encrypted Multi-Program Transport Stream.

17. The method of claim 11, further comprising outputting, from said source center, conditional access messaging with said encrypted input transport stream for controlling access of a consumer premises equipment device to content of said encrypted input transport stream.

18. The method of claim 11, wherein said plurality of destination devices include at least one Converged Cable Access Platform (CCAP) device.

19. The method of claim 11, wherein said plurality of destination devices include at least one Edge Quadrature Amplitude Modulation (EQAM) device.

\* \* \* \* \*